US009389116B2

(12) United States Patent
Aoyama et al.

(10) Patent No.: US 9,389,116 B2
(45) Date of Patent: Jul. 12, 2016

(54) WEIGHT DETECTION SENSOR AND VEHICLE SEAT APPARATUS INCLUDING A STRAIN BODY BETWEEN THE FLOOR AND THE VEHICLE SEAT

(71) Applicant: Aisin Seiki Kabushiki Kaisha, Kariya-shi (JP)

(72) Inventors: Mutsuro Aoyama, Nagoya (JP); Kan Ichihara, Kariya (JP); Hiroyuki Fujii, Kariya (JP); Kazumasa Seo, Nagakute (JP); Koji Washino, Anjo (JP)

(73) Assignee: AISIN SEIKI KABUSHIKI KAISHA, Kariya-shi (KR)

( * ) Notice: Subject to any disclaimer, the term of this patent is extended or adjusted under 35 U.S.C. 154(b) by 209 days.

(21) Appl. No.: 14/227,057

(22) Filed: Mar. 27, 2014

(65) Prior Publication Data
US 2014/0338989 A1 Nov. 20, 2014

(30) Foreign Application Priority Data
May 14, 2013 (JP) ................................. 2013-101980

(51) Int. Cl.
| | |
|---|---|
| *G01G 19/08* | (2006.01) |
| *B60R 21/015* | (2006.01) |
| *G01L 1/22* | (2006.01) |
| *G01G 19/414* | (2006.01) |
| *B60N 2/00* | (2006.01) |

(52) U.S. Cl.
CPC ................ *G01G 19/08* (2013.01); *B60N 2/002* (2013.01); *B60R 21/0152* (2014.10); *G01G 19/4142* (2013.01); *G01L 1/2206* (2013.01)

(58) Field of Classification Search
CPC ........ B60R 21/01521–21/01526; B60N 2/002; G01L 1/2206; G01G 19/4142; G01G 19/08
See application file for complete search history.

(56) References Cited

U.S. PATENT DOCUMENTS

| | | | | | |
|---|---|---|---|---|---|
| 5,823,278 | A | * | 10/1998 | Geringer | G01G 19/445 177/144 |
| 6,583,367 | B2 | * | 6/2003 | Wolfe | B60R 21/0155 177/136 |
| 6,670,560 | B2 | * | 12/2003 | Curtis | B60N 2/015 177/144 |
| 6,928,889 | B2 | * | 8/2005 | Kojima | G01G 19/4142 73/862.451 |
| 7,049,529 | B2 | * | 5/2006 | Vogel | G01G 19/4142 177/144 |
| 7,055,365 | B2 | * | 6/2006 | Yanagi | G01G 19/4142 177/211 |
| 7,155,981 | B2 | | 1/2007 | Matsuura et al. | |
| 7,189,931 | B2 | * | 3/2007 | Hida | G01G 19/4142 177/211 |
| 7,487,687 | B2 | * | 2/2009 | Sumi | G01G 19/4142 73/862.391 |

(Continued)

FOREIGN PATENT DOCUMENTS

JP 2003-83707 3/2003

*Primary Examiner* — Randy W Gibson
(74) *Attorney, Agent, or Firm* — Oblon, McClelland, Maier & Neustadt, L.L.P.

(57) ABSTRACT

A weight detection sensor interposed between a seat side fixing member and a floor side fixed member to measure a load of a passenger sitting in the seat, includes: a strain body fixed to both end portions of a mounting surface formed on one of the floor side fixed member and the seat side fixing member at a predetermined distance from the mounting surface; a connection member fixed to a central portion of the strain body in a vertical direction and fixed to the other one of the floor side fixed member and the seat side fixing member; and a Wheatstone bridge circuit where first and third strain detection elements are arranged on sides facing each other and second and fourth strain detection elements are arranged on sides facing each other, each of the strain detection elements being a variable resistor.

9 Claims, 10 Drawing Sheets

(56) References Cited

U.S. PATENT DOCUMENTS

| | | | | |
|---|---|---|---|---|
| 7,490,523 B2* | 2/2009 | Sakamoto | B60N 2/002 | 73/862.391 |
| 7,509,871 B2* | 3/2009 | Nakano | B60N 2/002 | 73/781 |
| 7,555,960 B2* | 7/2009 | Nakano | B60N 2/002 | 73/781 |
| 7,712,374 B2* | 5/2010 | Kawabata | B60N 2/002 | 73/781 |
| 8,258,413 B2* | 9/2012 | Ito | G01G 3/1402 | 73/781 |
| 9,021,888 B2* | 5/2015 | Takuma | G01L 1/2206 | 73/855 |
| 2004/0231435 A1* | 11/2004 | Kobata | G01G 19/4142 | 73/862.381 |
| 2008/0156103 A1* | 7/2008 | Nakano | B60N 2/002 | 73/781 |
| 2009/0126500 A1* | 5/2009 | Ito | G01L 1/2231 | 73/781 |

* cited by examiner

WEIGHT DETECTION SENSOR AND VEHICLE SEAT APPARATUS INCLUDING A STRAIN BODY BETWEEN THE FLOOR AND THE VEHICLE SEAT

CROSS REFERENCE TO RELATED APPLICATIONS

This application is based on and claims priority under 35 U.S.C. §119 to Japanese Patent Application 2013-101980, filed on May 14, 2013, the entire contents of which are incorporated herein by reference.

TECHNICAL FIELD

This disclosure relates to a weight detection sensor that accurately detects a passenger sitting in a vehicle seat, and a vehicle seat apparatus including the weight detection sensor.

BACKGROUND DISCUSSION

In the related art, techniques for controlling operations of various safety devices according to a weight of a passenger sitting in a seat are known to improve performances of the safety devices equipped in a vehicle such as seat belts and airbags. For example, it is typical that a warning light of "Fasten Seat Belt" is displayed after a detection of the sitting when the passenger sits in the seat but does not fasten the seat belt. In addition, according to regulations in practice in North America, the airbag has to be deployed in case of an accident in a case where an adult sits in an assistant driver's seat. In this manner, it is very important, in terms of safety, to detect and accurately determine the weight of the passenger.

As an example of the related art, JP 2003-83707A (Reference 1) discloses a strain sensor that includes a sensor substrate (strain body) which has two fixed holes fixed to one member disposed in both end portions of a long plate, a detection hole arranged between the two fixed holes to be fixed to the other member, and at least one strain detection element adhered to an upper surface of the long plate between the fixed holes and the detection hole, the strain sensor further including a fixing member that is press-fitted into each of the fixed holes of the sensor substrate, and a detection member (connection member) that is press-fitted into the detection hole of the sensor substrate. An external force is applied to the end portion of the detection member abutting against the sensor substrate and a reaction force is applied to the end portions of the two fixing members abutting against the sensor substrate, and a strain is detected by using the strain detection element adhered to the sensor substrate based on the external force and the reaction force.

In the strain sensor according to JP 2003-83707A (Reference 1), a plurality of strain detection elements are arranged in parallel on a central straight line in a longitudinal direction of the sensor substrate (strain body). These strain detection elements can detect a load value or the like by using the strain caused by pulling and compression with respect to one direction (direction parallel with a gauge length). Accordingly, in a case where a load of the passenger in an up-down direction added to the vehicle seat is transmitted to the sensor substrate, the weight of the passenger can be detected by using the strain of the strain detection element arranged in the sensor substrate when the strain sensor according to JP 2003-83707A (Reference 1) is interposed between the vehicle seat and the floor side fixed member, the detection hole is connected to a seat frame (seat side fixing member), and the fixed hole is connected to the floor side fixed member.

The seat frame in which the sensor substrate is arranged is a rigid body that has a rectangular shape. However, due to a biased load applied to the seat frame, both ends of the seat frame in a left-right direction tend to be obliquely deformed in opposite directions about an axis of rotation (imaginary) in the left-right direction.

Accordingly, a relative angular displacement may be generated between the floor side fixed member and the seat frame about the axis of rotation in the left-right direction. The relative angular displacement affects a strain of the strain detection element performing the weight detection, and thus the weight of the passenger may not be detected with accuracy.

SUMMARY

Thus, a need exists for a weight detection sensor which is not suspectable to the drawback mentioned above.

An aspect of this disclosure is directed to a weight detection sensor interposed between a seat side fixing member fixing a vehicle seat and a floor side fixed member fixing the seat side fixing member to a vehicle floor to measure a load of a passenger sitting in the vehicle seat, the weight detection sensor including a strain body fixed to both end portions of a mounting surface formed on one of the floor side fixed member and the seat side fixing member at a predetermined distance from the mounting surface, the strain body extending in a front-back direction of the vehicle seat, a connection member fixed to a central portion of the strain body in a vertical direction and fixed to the other one of the floor side fixed member and the seat side fixing member, and a Wheatstone bridge circuit where a first strain detection element and a third strain detection element are arranged on sides facing each other and a second strain detection element and a fourth strain detection element are arranged on sides facing each other, each of the strain detection elements being a variable resistor, in which the first strain detection element is adhered to a first tensile position of the strain body where an outer surface of the strain body is subjected to a tensile deformation and the third strain detection element is adhered to a first compression position of the strain body where the outer surface of the strain body is subjected to a compressive deformation on a side opposite to the first strain detection element about a left-right direction center line vertical to a front-back direction of the strain body in a state where a relative angular displacement in the front-back direction works in one direction between the seat side fixing member and the floor side fixed member, the second strain detection element is adhered to a second compression position of the strain body where the outer surface of the strain body is subjected to the compressive deformation on the same side as the first strain detection element with respect to the left-right direction center line of the strain body and the fourth strain detection element is adhered to a second tensile position of the strain body where the outer surface of the strain body is subjected to the tensile deformation on a side opposite to the second strain detection element with respect to the left-right direction center line of the strain body in the state where the relative angular displacement in the front-back direction works in the one direction between the seat side fixing member and the floor side fixed member, and the first to fourth strain detection elements are equally adhered on both sides of a front-back direction center line in the strain body.

Another aspect of this disclosure is directed to a vehicle seat apparatus including a seat side fixing member fixing a vehicle seat and a floor side fixed member fixing the seat side fixing member to a vehicle floor, in which the floor side fixed member is a pair of slide rails disposed to be slidable in a vehicle front-back direction with respect to the vehicle floor and arranged in parallel with each other, and the weight detection sensor according to any one of the aspect to the fourth aspect described above is fixed to the mounting surface on a front side and the mounting surface on a back side in a front-back direction of the vehicle seat in at least one of the pair of slide rails.

According to the aspect of this disclosure, the first strain detection element is adhered to the first tensile position of the strain body where the outer surface of the strain body is subjected to the tensile deformation in a state where the relative angular displacement in the front-back direction works in one direction between the seat side fixing member and the floor side fixed member, and the third strain detection element is adhered to the first compression position of the strain body where the outer surface of the strain body is subjected to the compressive deformation on the side opposite to the first strain detection element about the left-right direction center line vertical to the front-back direction of the strain body in the state. Accordingly, when the relative angular displacement works in the one direction, strain values of the first strain detection element and the third strain detection element are detected in a state where a tensile strain component generated at the first tensile position and a compressive strain component generated at the first compression position are offset.

In the state, the second strain detection element is adhered to the second compression position of the strain body where the outer surface of the strain body is subjected to the compressive deformation on the same side as the first strain detection element with respect to the left-right direction center line of the strain body, and the fourth strain detection element is adhered to the second tensile position of the strain body where the outer surface of the strain body is subjected to the tensile deformation on the side opposite to the second strain detection element with respect to the left-right direction center line of the strain body. Accordingly, when the relative angular displacement works in the one direction, strain values of the second strain detection element and the fourth strain detection element are detected in a state where a compressive strain component generated at the second compression position and a tensile strain component generated at the second tensile position are offset.

The first to fourth strain detection elements are equally adhered to both sides of the front-back direction center line in the strain body, and thus even the strain values generated in each of the first to fourth strain detection elements caused by the relative angular displacement affecting not only the strict front-back direction but also the left-right direction such as a direction inclined from the front-back direction can be offset by the strain detection elements on the opposite sides about the front-back direction center line.

In this manner, even in a state where the relative angular displacement in the front-back direction works between the floor side fixed member and the seat side fixing member, the weight of the passenger can be accurately detected since the output voltage from the Wheatstone bridge circuit is based only on the strain detected when the passenger sits.

According to the another aspect of this disclosure, the strain generated by the relative angular displacement can be offset in each of the weight detection sensors on the mounting surface on the front side and on the mounting surface on the back side, and the load of the passenger can be obtained by adding the load values based on the independently obtained strain data. The loads applied by the weight of the passenger to a front and a back of the vehicle seat are different from each other in a case where the passenger sits in the vehicle seat, but the loads in the front and the back of the vehicle seat are detected by the respective weight detection sensors on the mounting surface on the front side and the mounting surface on the back side, and thus the weight of the passenger can be accurately detected.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiment 1

Hereinafter, a first embodiment of a weight detection sensor 10 of a vehicle seat apparatus 100 disclosed here will be described with reference to the accompanying drawings. "Front-back, left-right, and up-down" directions used in this specification refer to respective directions of a vehicle viewed from a passenger sitting in a vehicle seat apparatus 100. In addition, in this embodiment, the vehicle is a left-hand drive vehicle, and the presence or absence of the passenger sitting in the assistant driver's seat is determined.

Figure 1:
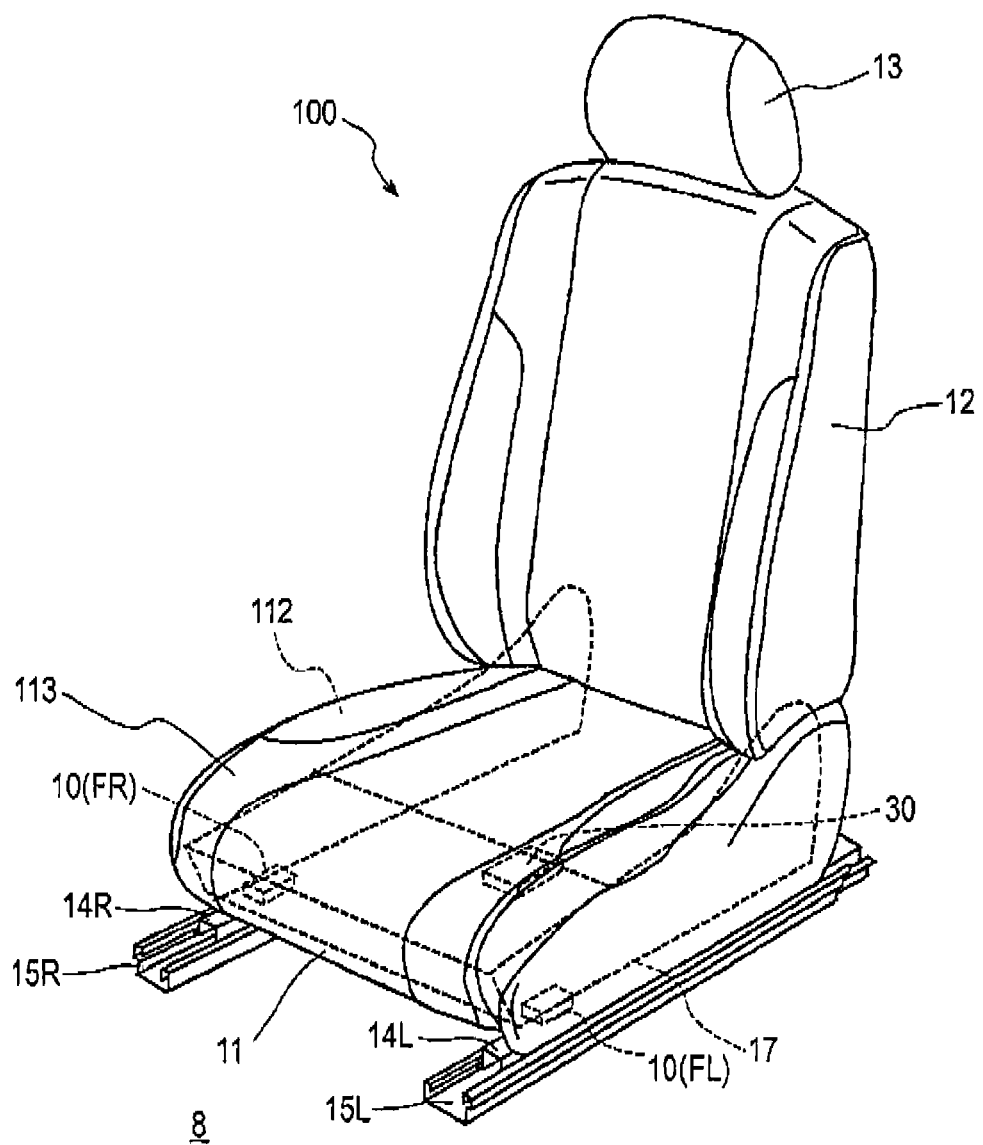
FIG. 1 is a diagram illustrating a first embodiment in which a weight detection sensor disclosed here is arranged in a seat cushion.

As illustrated in FIG. 1, the vehicle seat apparatus 100 for the assistant driver's seat includes a seat cushion 11 on which the passenger sits, and a seat back 12, which is a backrest for the passenger, mounted on a back end portion of the seat cushion 11 to be pivotable in the front-back direction. In addition, a headrest 13 that supports the head of the passenger is mounted on an upper end of the seat back 12.

The seat cushion 11 has a seat frame (seat side fixing member) 17, a pad member 112 that is arranged on the seat frame 17, and an outer skin 113 that covers an outer surface of the pad member 112. A pair of left and right upper rails (floor side fixed members) 14R and 14L are mounted on a lower surface of the seat frame 17. The seat frame 17 is mounted via weight detection sensors (described later) disposed on a mounting surface 18 disposed on a front end upper surface and a back end upper surface of the left side upper rail 14L. The upper rails 14R and 14L are respectively engaged on a pair of lower rails 15R and 15L that are fixed on a vehicle floor 8 to be movable in the front-back direction. In this manner, the vehicle seat apparatus 100 can be moved in the front-back direction on the vehicle floor 8 and can be fixed to a position desired by the passenger.

Figure 2:
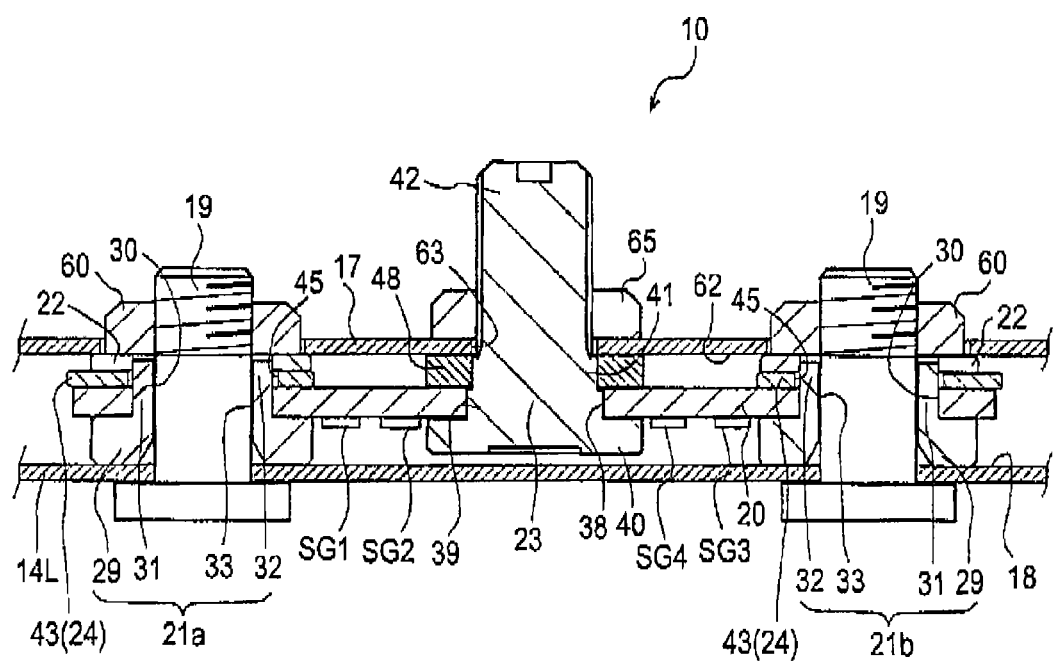
FIG. 2 is a sectional diagram of the weight detection sensor that is assembled between a seat frame and an upper rail.

Next, the weight detection sensor 10 will be described. The weight detection sensor 10 that is mounted on the left side upper rail 14L and the weight detection sensor 10 that is mounted on the right side upper rail 14R are similar to each other, and thus mainly the weight detection sensor 10 that is mounted on the left side upper rail 14L will be described. The weight detection sensor 10 is configured to have the plate-shaped strain body 20 having a substantially rectangular shape, first to fourth strain detection elements SG1 to SG4 that are attached to a rear surface of the strain body 20 as illustrated in FIGS. 2 to 4, the first and second lower brackets 21a and 21b that fix both end portions of the strain body 20 to the mounting surface 18 of the left side upper rail 14L such that the strain body 20 extends in the front-back direction, a connection member 23 that is fixed, in a vertical direction, to a central portion of the strain body 20 and is fixed to the seat frame 17, an upper bracket 24 having both end portions engaged with an upper surface of the strain body 20, an amplifier substrate (not shown) that amplifies a signal from each of the strain detection elements SG1 to SG4, an amplifier case 27 in which the amplifier substrate is accommodated, a flexible printed circuits (FPC) substrate 28 that is connected to each of the strain detection elements SG1 to SG4 and the amplifier substrate, and the like.

Figure 3:
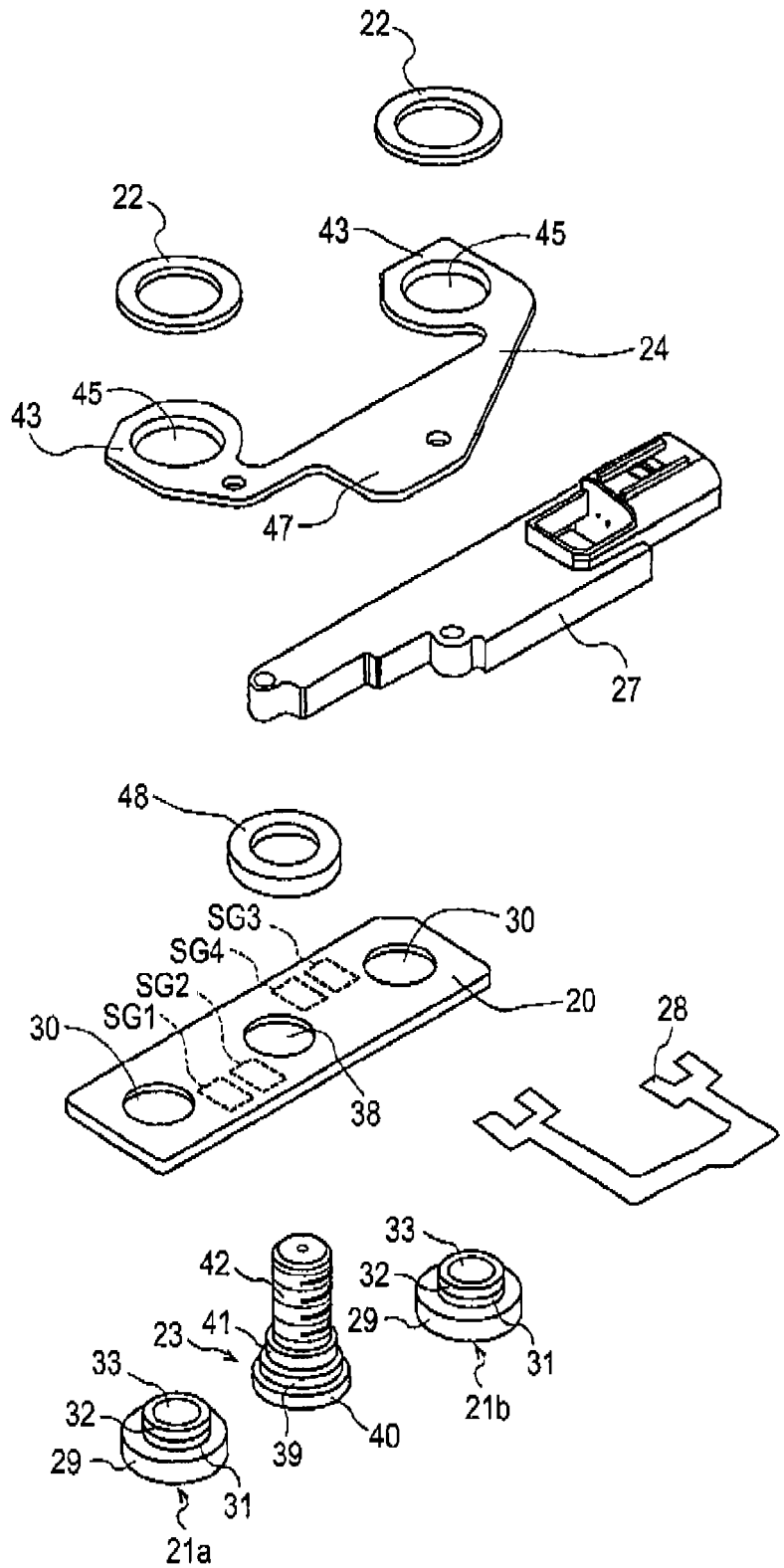
FIG. 3 is an exploded perspective diagram of the weight detection sensor.
Figure 4:
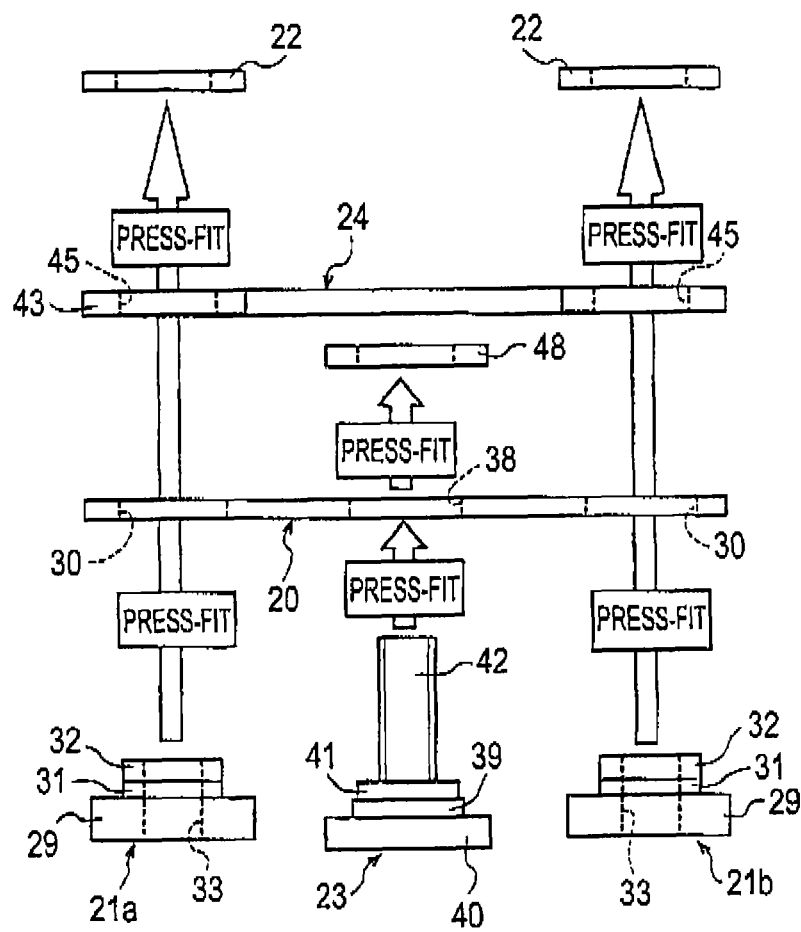
FIG. 4 is a diagram illustrating an assembled state of the weight detection sensor.

As illustrated in FIGS. 3 and 4, each of the first and second lower brackets 21a and 21b has a base portion 29 that has a predetermined thickness, a middle shaft portion 31 that projects from the base portion 29 and is press-fitted into a fixing hole 30 (described later) which is bored on both end sides of the strain body 20, a tip shaft portion 32 that projects from the middle shaft portion 31, and an insertion hole 33 that is bored to penetrate a center of each of the first and second lower brackets 21a and 21b.

The fixing holes 30 are formed in both of the end portions of the strain body 20, and both of the fixing holes 30 are bored apart from each other by a predetermined distance that is equal to a gap between fixed shafts 19 which project from both end portions of the left side upper rail 14L. As illustrated in FIG. 4, the middle shaft portion 31 is press-fitted into the fixing hole 30 (may not be press-fitted) until an outer surface of the strain body 20 abuts against the base portions 29 of the first and second lower brackets 21a and 21b. A central hole 38 is bored in the central portion of the strain body 20, and a middle shaft portion 39 of the connection member 23 is press-fitted into the central hole 38. A flange 40 with a thickness smaller than a thickness of the base portion 29 of the first and second lower brackets 21a and 21b is formed in a base end portion of the connection member 23 to abut against the outer surface of the strain body 20. In addition, a tip middle shaft portion 41 projects from the middle shaft portion (connection member 23) 39, and a fixing screw portion 42 projects from an end surface of the tip middle shaft portion 41. The tip middle shaft portion 41 is press-fitted into a center bracket 48 in a state where the middle shaft portion 39 of the connection member 23 is press-fitted into the central hole 38 of the strain body 20 such that the base end portion of the connection member 23 is fixed to the strain body 20 with the strain body 20 being clamped between the flange 40 and the center bracket 48.

In addition, a tip end portion of the connection member 23 is connected to the vehicle seat apparatus 100 as follows. A connection surface 62 is formed on a rear side of the seat frame 17 of the vehicle seat apparatus 100, and a connection hole 63 is bored in the connection surface 62. The connection hole 63 is fitted into the fixing screw portion 42 of the connection member 23 such that the connection surface 62 abuts against an upper surface of the center bracket 48. The seat frame 17 is placed on the left side upper rail 14L via the strain body 20. When a nut 65 that is screwed into the fixing screw portion 42 is tightened, the connection surface 62 is pressure-bonded to the upper surface of the center bracket 48, and the connection member 23 of the weight detection sensor 10 is fixed to the seat frame 17.

In addition, as illustrated in FIG. 3, the upper bracket 24 that is made of steel or the like is assembled in both end portions of the upper surface of the strain body 20. Mounting portions 43 are integrally disposed in both end portions of the upper bracket 24, and mounting holes 45 are bored in the respective mounting portions 43 as illustrated in FIG. 3. The tip shaft portions 32 of the first and second lower brackets 21a and 21b that project from the upper surface of the strain body 20 are inserted into the respective mounting holes 45, and washer members 22 are respectively press-fitted into the tip shaft portions 32 of the first and second lower brackets 21a and 21b that project from the upper bracket 24. An amplifier case mounting portion 47 that integrally connects the mounting portions 43 at both ends with each other is formed in the upper bracket 24 to extend sideways from the strain body 20 as illustrated in FIG. 3.

Both of the end portions of the strain body 20 are pinched, along with the upper bracket 24, between the washer member 22 and the base portions 29 of the first and second lower brackets 21a and 21b.

As illustrated in FIG. 2, the insertion holes 33 of the first and second lower brackets 21a and 21b are fitted into the fixed shafts 19 that project in the vertical direction in the end portions of the left side upper rail 14L, and bottom surfaces of the base portions 29 sit on the mounting surface 18. When a fastening nut 60 that is screwed into a threaded portion which is engraved at a tip end of the fixed shaft 19 is tightened, the mounting portion 43 of the upper bracket 24 is pressed. In this manner, both of the end portions of the strain body 20 of the weight detection sensor 10 are fixed to the mounting surface 18 of the left side upper rail 14L at a predetermined distance, which is equal to the thickness of the base portion 29, from the mounting surface 18.

Figure 5:
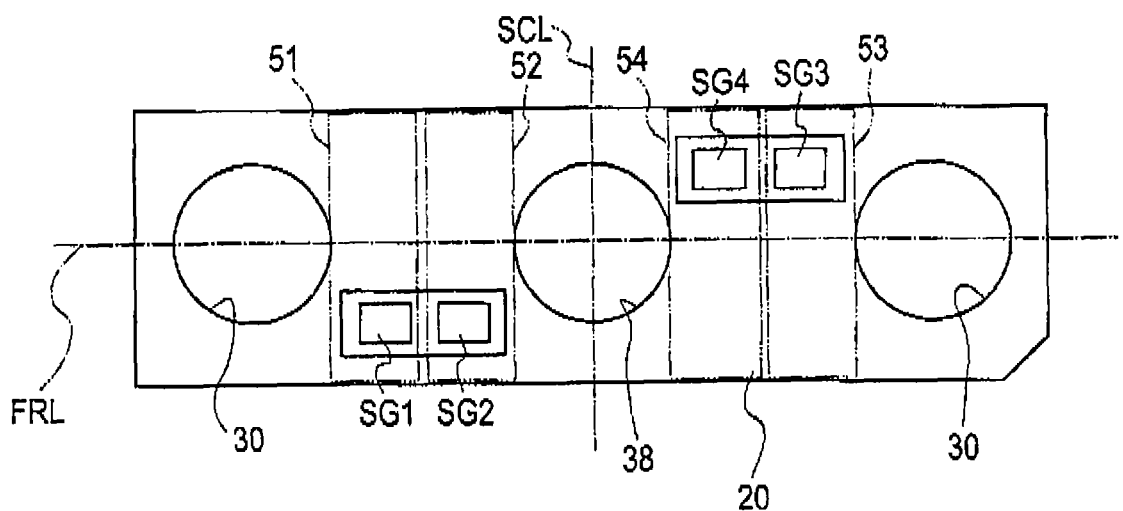
FIG. 5 is a diagram illustrating a state where each of strain detection elements is adhered to a strain body of the weight detection sensor according to the first embodiment.
Figure 8:
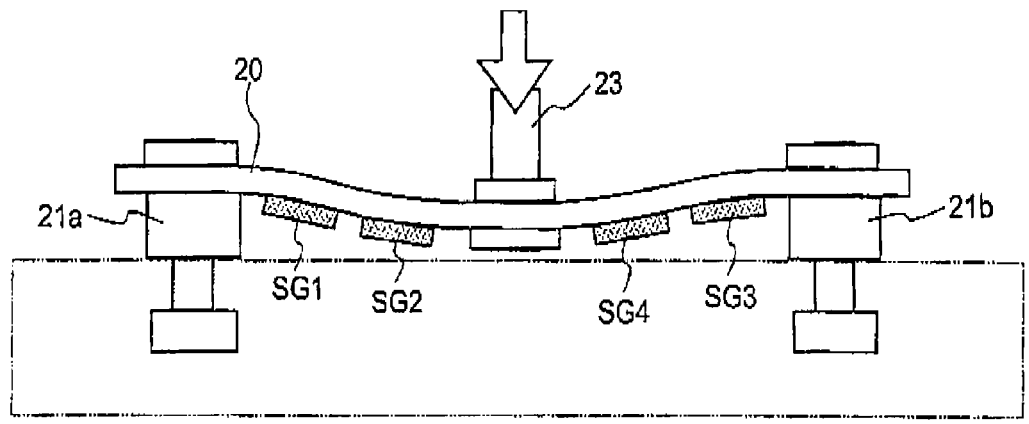
FIG. 8 is a diagram illustrating a normal deformation state of the strain body in a case where a load from an up-down direction is applied by a weight of a passenger.

The strain body 20, the central portion of which is fixed to the seat frame 17 via the connection member 23 and both of the end portions of which are fixed to the left side upper rail 14L as described above, is bent with both of the end portions thereof being supported by the first and second lower brackets 21a and 21b as illustrated in FIG. 8 when a load of the passenger sitting on the seat cushion 11 is added to the strain body 20 via the connection member 23. When the bending occurs, a compressive strain is generated on first and second lower bracket 21a and 21b sides and a tensile strain is generated on connection member 23 sides on the outer surface of the strain body 20, in proportion to the load, between the first lower bracket 21a and the connection member 23 and between the second lower bracket 21b and the connection member 23. In order to detect these compressive strain and tensile strain, the first to fourth strain detection elements SG1 to SG4 are adhered to the rear surface of the strain body 20, as illustrated in FIG. 5, between both of the end portions of the strain body 20 and the central portion, that is, between the first lower bracket 21a and the connection member 23 and between the second lower bracket 21b and the connection member 23. The first to fourth strain detection elements SG1 to SG4 can detect a tensile deformation and a compressive deformation in the front-back direction in which the strain body 20 extends as expansion and contraction of the adhered strain detection element itself and, work as variable resistors of a bridge circuit (described later) because the first to fourth strain detection elements SG1 to SG4 have electrical resistance proportional to the expansion and the contraction.

Of these strain detection elements, the first strain detection element SG1 is arranged in the vicinity of the first lower bracket 21a on a left side of a left-right direction center line SCL in FIG. 5 that extends in the left-right direction vertically to the strain body 20 extending in the front-back direction and equally divides the strain body 20 in the front-back direction and on a lower side of a front-back direction center line FRL in FIG. 5 that extends in the front-back direction of the strain body 20 and equally divides the strain body 20 in the left-right direction. The third strain detection element SG3 is arranged in the vicinity of the second lower bracket 21b on a right side (side opposite to the first strain detection element SG1) of the left-right direction center line SCL and on an upper side of the front-back direction center line FRL in FIG. 5. The second strain detection element SG2 is arranged in the vicinity of the connection member 23 on a left side of the left-right direction center line SCL in FIG. 5 and on a lower side of the front-back direction center line FRL in FIG. 5. The fourth strain detection element SG4 is arranged in the vicinity of the connection member 23 on a right side of the left-right direction center line SCL in FIG. 5 and on an upper side of the front-back direction center line FRL in FIG. 5.

Figure 6:
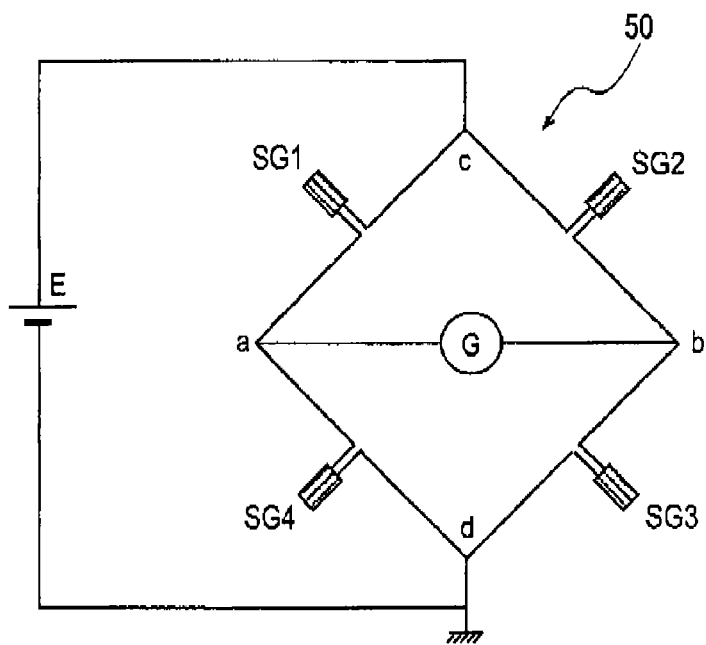
FIG. 6 is a diagram illustrating a Wheatstone bridge circuit to which each of the strain detection elements is connected as a variable resistor.

In addition, the first strain detection element SG1 to the fourth strain detection element SG4 constitute the variable resistors of a Wheatstone bridge circuit 50 as illustrated in FIG. 6. The first strain detection element SG1 is arranged between sides a and c of the Wheatstone bridge circuit 50, and the third strain detection element SG3 is arranged between sides b and d that face the sides a and c. The second strain detection element SG2 is arranged between the sides b and c of the Wheatstone bridge circuit 50, and the fourth strain detection element SG4 is arranged between the sides a and d that face the sides b and c. In this manner, a full bridge that has the first to fourth strain detection elements SG1 to SG4 as the variable resistors is constituted along with the FPC substrate 28 (described later) on the rear surface of the strain body 20, and the load of the passenger sitting on the seat cushion 11 is measured as the bending of the strain body 20.

As illustrated in FIG. 3, the amplifier case 27 made of a polybutylene terephthalate (PBT) resin or the like is mounted, by using a screw (not shown) and in parallel with the strain body 20, on the amplifier case mounting portion 47 of the upper bracket 24. Since made of the PBT resin, the amplifier case 27 can be reduced in weight and cost compared to an aluminum case of the related art. In addition, a connector (not shown) is disposed in the amplifier case 27 to connect a communication line through which an output of the amplifier substrate is transmitted to an electronic control unit (not shown).

In addition, as illustrated in FIG. 3, tip ends of both leg portions of the FPC substrate 28 that has a U shape are connected to the first to fourth strain detection elements SG1 to SG4 between both of the end portions of the strain body 20 and the central portion. As described above, these strain detection elements constitute the variable resistors of the Wheatstone bridge circuit 50, and a wiring part of the FPC substrate 28 constitutes wiring connecting the variable resistors of the Wheatstone bridge circuit 50 with each other. A U-shaped central part (corresponding to between a and b of the Wheatstone bridge circuit) of the FPC substrate 28 is connected to an amplifier circuit of the amplifier substrate.

Figure 7:
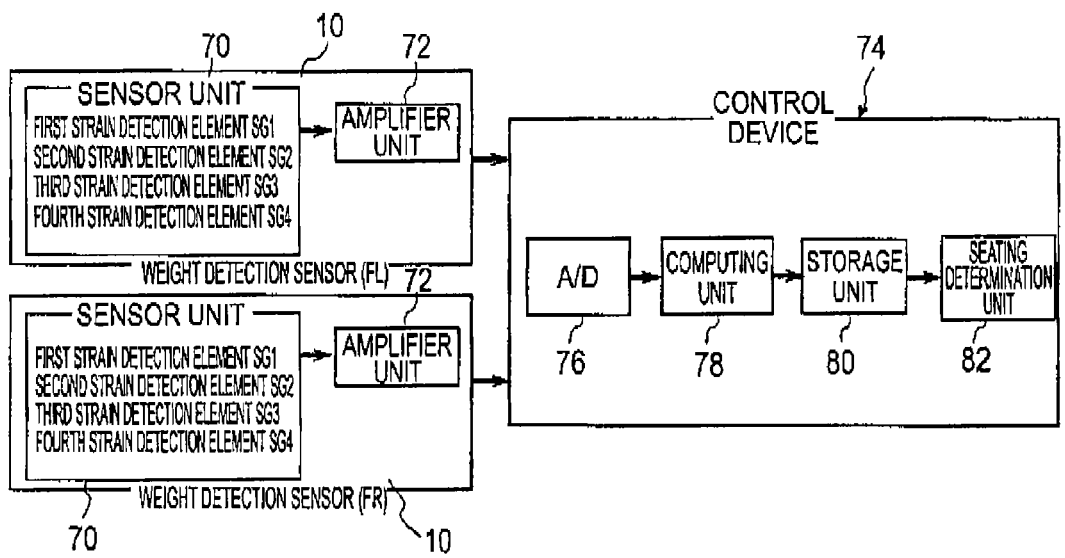
FIG. 7 is a block diagram illustrating the weight detection sensor and a control device.

As illustrated in FIG. 7, the weight detection sensor 10 has a sensor unit 70 that is configured to have the Wheatstone bridge circuit 50, which has the first to fourth strain detection elements SG1 to SG4, and the like, and an amplifier unit 72 that amplifies a detection signal which is generated by the sensor unit 70. The weight detection sensor 10 is connected to a control device 74, and a seat belt device detection unit, an airbag indicator lamp, and the like (not shown) are connected to the control device 74.

The control device 74 has an A/D converter 76 that digitally converts an analog detection signal from the weight detection sensor 10, and a computing unit 78 into which the detection signal from the weight detection sensor 10 is input. The computing unit 78 adds, for example, a detection value of the weight detection sensor 10 arranged in a front end portion FL of the left side upper rail 14L and a detection value of the weight detection sensor 10 arranged in a front end portion FR of the right side upper rail 14R, stores the computed value in a storage unit 80, and then transmits the value to the a seating determination unit 82. "The presence of the passenger," "the absence of the passenger," and the like are determined and the airbag indicator lamp and the like are controlled through various determination processes by the seating determination unit 82.

The weight detection sensor outputs a positive detection signal in a case where a downward load is applied to the seat cushion 11 as, for example, the passenger sits in the vehicle seat apparatus 100. The weight detection sensor outputs a negative detection signal in a case where an upward load is applied to the seat cushion 11. Both of the weight detection sensors that are respectively arranged in the front end portion FL of the left side upper rail 14L and in the front end portion FR of the right side upper rail 14R are zero-adjusted to have a load value of zero in a state of vehicle shipment.

Next, an operation of the weight detection sensor having the above-described configuration will be described as follows with reference to the drawings.

In a case where the passenger sits in the vehicle seat apparatus 100 equipped with the weight detection sensor 10 according to this embodiment, the weight of the passenger is applied in the up-down direction. Accordingly, as illustrated in FIG. 8, the compressive deformation is generated at sites where the first strain detection element SG1 and the third strain detection element SG3 are adhered and the compressive deformation is generated at sites where the second strain detection element SG2 and the fourth strain detection element SG4 are adhered.

It is known that, assuming that K is a gauge factor (K=2), E is a bridge voltage, and S1 to S4 are the strains of the respective strain detection elements caused by the weight of the passenger, a voltage e that is output to the Wheatstone bridge circuit is expressed by the following equation.

$$e=(E/4) \times K \times (S1-S2+S3-S4)$$

The load of the passenger is obtained based on the voltage e that is output to the Wheatstone bridge circuit.

Figure 9:
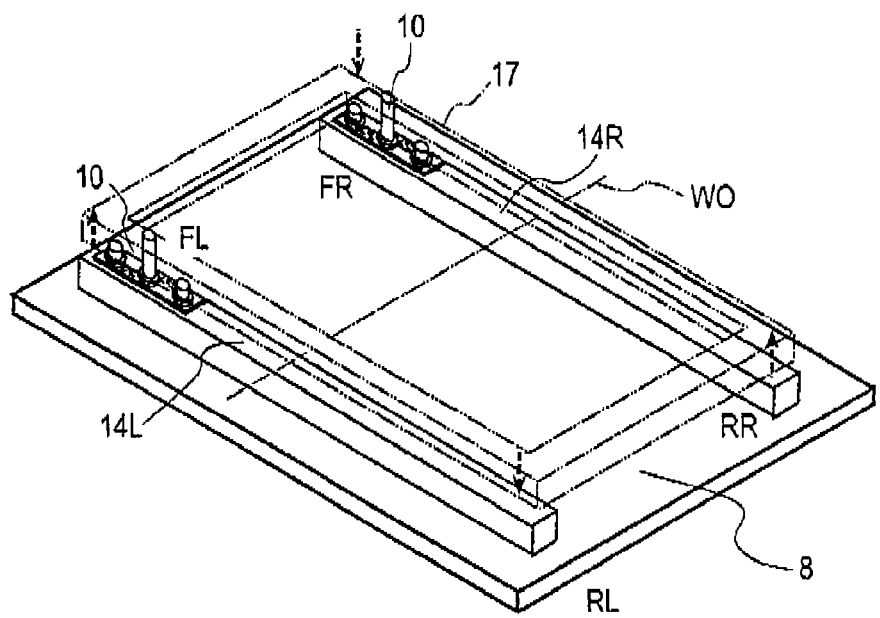
FIG. 9 is a diagram illustrating a vehicle floor to which a large external force is applied.
Figure 10:
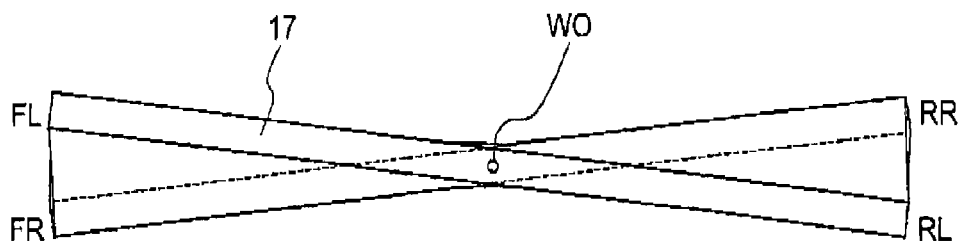
FIG. 10 is a diagram illustrating a deformation tendency of the vehicle floor at a time when the large external force is applied.

The seat frame 17 in which the weight detection sensor 10 is arranged is a rigid body that has a rectangular shape. However, due to a biased load applied to the seat frame 17 as illustrated in FIG. 9, both ends of the seat frame 17 in the left-right direction tend to be obliquely deformed in the opposite directions about an axis of rotation (imaginary) in the left-right direction as illustrated in FIG. 10.

Figure 11:
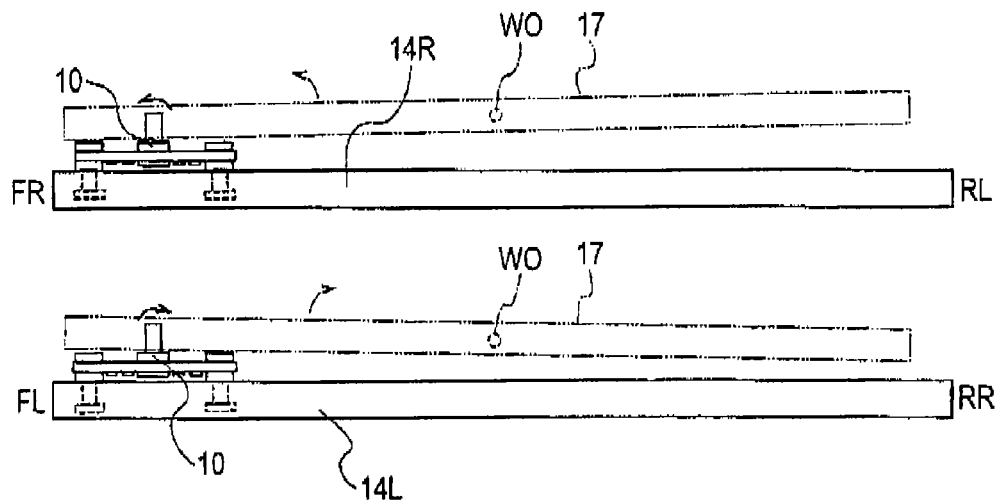
FIG. 11 is a diagram illustrating a relative angular displacement that is received by the weight detection sensor which is fixed to the upper rail.
Figure 12:
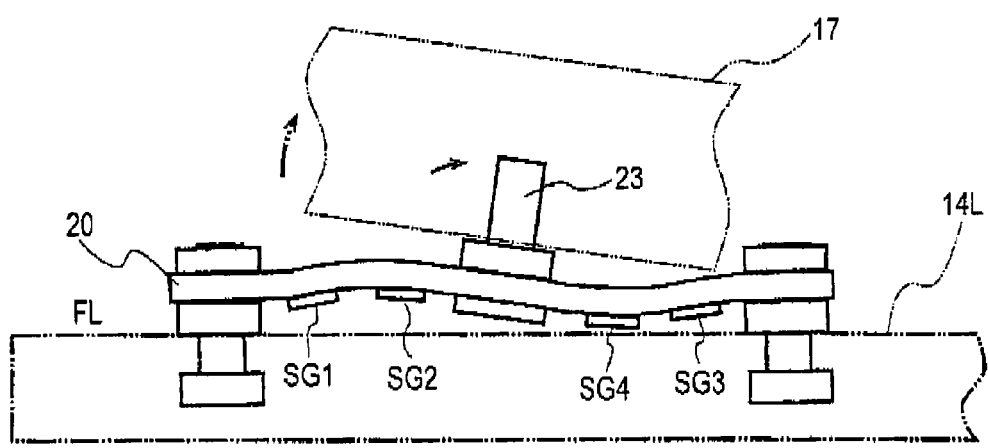
FIG. 12 is an explanatory diagram, viewed from a side, illustrating a state where the strain body is deformed by a rotational moment load component that is applied by a connection member which is fixed to the seat frame when the weight detection sensor receives the relative angular displacement.

Accordingly, a relative angular displacement about the axis of rotation in the left-right direction may be generated, as illustrated in FIG. 11, between the left and right upper rails 14L and 14R and the seat frame 17. For example, as illustrated in FIG. 12, the seat frame 17 rotates clockwise in FIG. 12 in the front end portion FL of the left side upper rail 14L, and the relative angular displacement is generated between the left side upper rail 14L and itself. Accordingly, a rotational moment is generated to rotate the connection member 23 clockwise. Assuming that the respective strains of the first strain detection element SG1, the second strain detection element SG2, the third strain detection element SG3, and the fourth strain detection element SG4 caused by the rotational moment in this case are Δs1x, Δs2x, Δs3x, and Δs4x, the strain is S1−Δs1x at the position where the first strain detection element SG1 is adhered since the strain value (refer to FIG. 8) detected to be increased by the compressive deformation is subjected to the tensile deformation (corresponding to a first tensile position 51). The strain is S2−Δs2x at the position where the second strain detection element SG2 is adhered since the strain value (refer to FIG. 8) increased by the tensile deformation is subjected to the compressive deformation (corresponding to a second compression position 52). The strain value is S3+Δs3x at the position where the third strain detection element SG3 is adhered since the strain value (refer to FIG. 8) detected to be increased by the compressive deformation is further subjected to the compressive deformation (corresponding to a first compression position 53). The strain value is S4+Δs4x at the position where the fourth strain detection element SG4 is adhered since the strain value (refer to FIG. 8) increased by the tensile deformation is further subjected to the tensile deformation (corresponding to a second tensile position 54).

When these strains are substituted in the equation of the voltage output to the Wheatstone bridge circuit, $e=(E/4) \times K \times \{(S1-\Delta s1x)-(S2-\Delta s2x)+(S3+\Delta s3x)-(S4+\Delta s4x)\}$.

In short, $e=(E/4) \times K \times \{(S1-S2+S3-S4)-(\Delta s1x-\Delta s3x)+(\Delta s2x-\Delta s4x)\}$.

Herein, the first strain detection element SG1 and the third strain detection element SG3 are respectively arranged in the vicinity of the first and second lower brackets 21a and 21b positioned on the opposite sides on the opposite sides about the left-right direction center line SCL. These are positions of point symmetry about a shaft center of the connection member 23, and thus Δs1x is equal to Δs3x. Likewise, the second strain detection element SG2 and the fourth strain detection element SG4 are respectively arranged in the vicinity of the sides opposite to the connection member 23 on the opposite sides about the left-right direction center line SCL, and thus Δs2x is equal to Δs4x.

Accordingly, Δs1x−Δs3x is equal to zero, Δs2x−Δs4x is equal to zero, and $e=(E/4) \times K \times (S1-S2+S3-S4)-0+0$. The strain caused by the rotational moment generated by the relative angular displacement is offset between the first strain detection element SG1 and the third strain detection element SG3 and is offset between the second strain detection element SG2 and the fourth strain detection element SG4.

Figure 13:
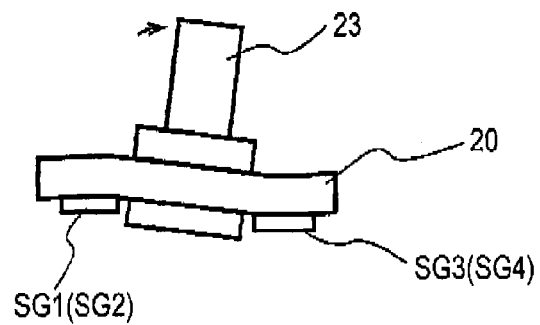
FIG. 13 is an explanatory diagram, viewed from a back face, illustrating a state where the strain body is deformed by the rotational moment load component working in a left-right direction when the relative angular displacement is received in an oblique direction that is inclined from a front-back direction.

In a case where the relative angular displacement is generated to affect not only the strict front-back direction but also the left-right direction, a relative angular displacement component that rotates the strain body 20 in the left-right direction about an axis of rotation (imaginary) extending in the front-back direction may be generated as illustrated in FIG. 13. In this case, the first strain detection element SG1 and the third strain detection element SG3 are positioned on the opposite sides with respect to the front-back direction center line FRL, and the second strain detection element SG2 and the fourth strain detection element SG4 are positioned on the opposite sides with respect to the front-back direction center line FRL. Assuming that the respective strains of the first strain detection element SG1, the second strain detection element SG2, the third strain detection element SG3, and the fourth strain detection element SG4 caused by the rotational moment in this case are Δs1y, Δs2y, Δs3y, and Δs4y, the strain is S1+Δs1y at the position where the first strain detection element SG1 is adhered since the strain value (refer to FIG. 8) detected to be increased by the compressive deformation is further subjected to the compressive deformation. The strain is S2−Δs2y at the position where the second strain detection element SG2 is adhered since the strain value (refer to FIG. 8) increased by the tensile deformation is subjected to the compressive deformation. The strain value is S3−Δs3y at the position where the third strain detection element SG3 is adhered since the strain value (refer to FIG. 8) detected to be increased by the compressive deformation is subjected to the tensile deformation. The strain value is S4+Δs4y at the position where the fourth strain detection element SG4 is adhered since the strain value (refer to FIG. 8) increased by the tensile deformation is further subjected to the tensile deformation.

When these strains are substituted in the equation of the voltage e output to the Wheatstone bridge circuit, $e=(E/4) \times K \times \{(S1+\Delta s1y)-(S2-\Delta s2y)+(S3-\Delta s3y)-(S4+\Delta s4y)\}$.

In short, $e=(E/4) \times K \times \{(S1-S2+S3-S4)+(\Delta s1y-\Delta s3y)+(\Delta s2y-\Delta s4y)\}$.

Herein, the first strain detection element SG1 and the third strain detection element SG3 are arranged on the opposite sides about the front-back direction center line FRL, and the first strain detection element SG1 is in the vicinity of the first lower bracket 21a and the third strain detection element SG3 is in the vicinity of the second lower bracket 21b. These are positions of point symmetry about the shaft center of the connection member 23, and thus $\Delta s1y$ is equal to $\Delta s3y$. Likewise, $\Delta s2y$ is equal to $\Delta s4y$.

Accordingly, $\Delta s1y - \Delta s3y$ is equal to zero, $\Delta s2y - \Delta s4y$ is equal to zero, and $e=(E/4) \times K \times (S1-S2+S3-S4)+0-0$. The strain caused by the rotational moment generated by the relative angular displacement is offset between the first strain detection element SG1 and the third strain detection element SG3 and is offset between the second strain detection element SG2 and the fourth strain detection element SG4.

In this manner, even in a state where the relative angular displacement in the front-back direction works between the left side upper rail 14L and the seat frame 17, the weight of the passenger can be accurately detected since the output voltage from the Wheatstone bridge circuit 50 is based only on the strain detected when the passenger sits.

In this embodiment, the detection value of the weight detection sensor 10 that is arranged in the front end portion FR of the right side upper rail 14R is added to the detection value of the weight detection sensor 10 that is arranged in the front end portion FL of the left side upper rail 14L in the computing unit 78 of the control device 74. The relative angular displacement is generated in the exactly opposite directions in the weight detection sensor 10 that is arranged in the front end portion FL of the left side upper rail 14L and the weight detection sensor 10 that is arranged in the front end portion FR of the right side upper rail 14R as illustrated in FIG. 11, and thus even the strain generated by, for example, the rotational moment not offset but remaining with the single weight detection sensor 10 can be offset by the detection values of the two weight detection sensors 10 where the relative angular displacement is generated in the opposite directions. In this manner, the weight of the passenger sitting in the vehicle seat can be detected with greater accuracy.

According to the weight detection sensor 10 having the above-described configuration, the first strain detection element SG1 is adhered to the first tensile position 51 of the strain body 20 where the outer surface of the strain body 20 is subjected to the tensile deformation in a state where the relative angular displacement in the front-back direction works in one direction between the seat frame 17 and the left side upper rail 14L, and the third strain detection element SG3 is adhered to the first compression position 53 of the strain body 20 where the outer surface of the strain body 20 is subjected to the compressive deformation on the side opposite to the first strain detection element SG1 about the left-right direction center line SCL extending vertically to the front-back direction of the strain body 20 in the state. Accordingly, when the relative angular displacement works in the one direction, strain data of the first strain detection element SG1 and the third strain detection element SG3 are detected in a state where a tensile strain component generated at the first tensile position 51 and a compressive strain component generated at the first compression position 53 are offset.

In the state, the second strain detection element SG2 is adhered to the second compression position 52 of the strain body 20 where the outer surface of the strain body 20 is subjected to the compressive deformation on the same side as the first strain detection element SG1 with respect to the left-right direction center line SCL of the strain body 20, and the fourth strain detection element SG4 is adhered to the second tensile position 54 of the strain body 20 where the outer surface of the strain body 20 is subjected to the tensile deformation on the side opposite to the second strain detection element SG2 with respect to the left-right direction center line SCL of the strain body 20. Accordingly, when the relative angular displacement works in the one direction, strain data of the second strain detection element SG2 and the fourth strain detection element SG4 are detected in a state where a compressive strain component generated at the second compression position 52 and a tensile strain component generated at the second tensile position 54 are offset.

The first to fourth strain detection elements SG1 to SG4 are equally adhered to both of the sides of the front-back direction center line FRL in the strain body 20, and thus even the strain generated in each of the first to fourth strain detection elements SG1 to SG4 caused by the relative angular displacement affecting not only the strict front-back direction but also the left-right direction such as a direction inclined from the front-back direction can be offset by the strain detection elements on the opposite sides about the front-back direction center line FRL. This is similar even when the relative angular displacement works in the other direction opposite to the one direction.

In this manner, even in a state where the relative angular displacement in the front-back direction works between the seat frame 17 and the left side upper rail 14L, the weight of the passenger can be accurately detected since the output voltage from the Wheatstone bridge circuit 50 is based only on the strain detected when the passenger sits.

The first strain detection element SG1 and the third strain detection element SG3 are arranged on the opposite sides about the front-back direction center line FRL in the strain body 20, and the second strain detection element SG2 and the fourth strain detection element SG4 are arranged on the opposite sides about the front-back direction center line FRL in the strain body 20. Accordingly, even the strain generated in each of the strain detection elements caused by the relative angular displacement affecting not only the strict front-back direction but also the left-right direction such as the direction inclined from the front-back direction can be offset by the first strain detection element SG1 and the third strain detection element SG3 that are on the opposite sides about the front-back direction center line FRL and the second strain detection element SG2 and the fourth strain detection element SG4 on the opposite sides about the front-back direction center line FRL. As such, the weight of the passenger can be accurately detected.

Figure 14:
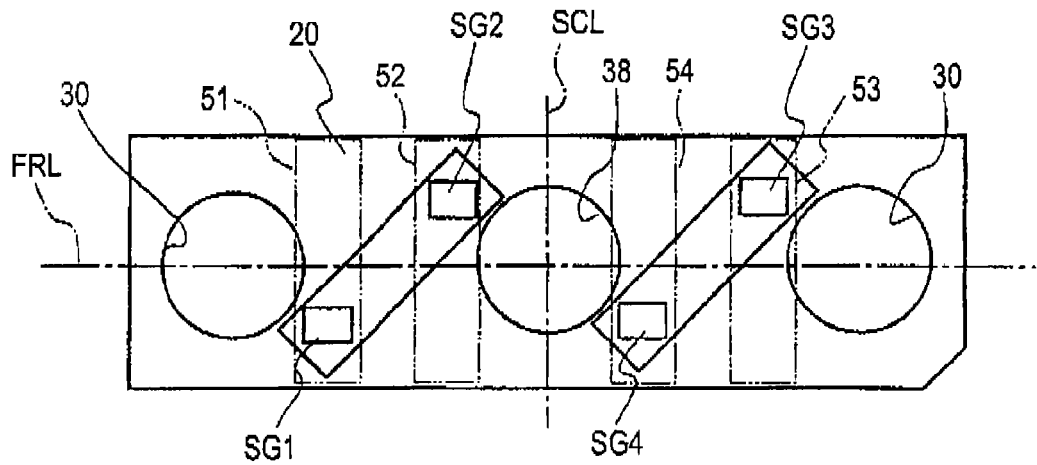
FIG. 14 is a diagram illustrating another example of an arrangement of each of the strain detection elements in the strain body according to the first embodiment.

In this embodiment, the first strain detection element SG1 and the second strain detection element SG2 are arranged on the same side about the front-back direction center line FRL, and the third strain detection element SG3 and the fourth strain detection element SG4 are arranged on the opposite side about the front-back direction center line FRL with respect to the first strain detection element SG1 and the like. However, the arrangement is not limited thereto but, for example, the first strain detection element SG1 and the second strain detection element SG2 may be arranged on the opposite sides about the front-back direction center line FRL and the third strain detection element SG3 and the fourth strain detection element SG4 may be arranged on the opposite sides about the front-back direction center line FRL as illustrated in FIG. 14.

Embodiment 2

Figure 15:
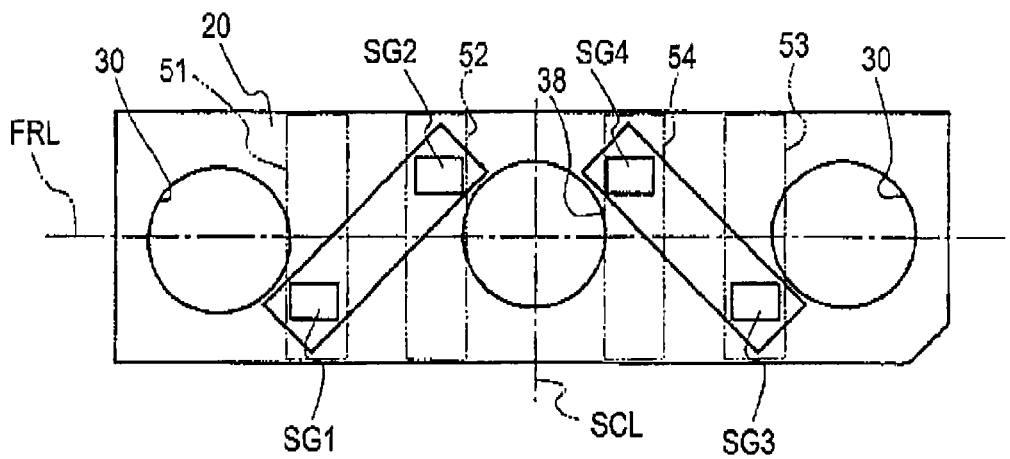
FIG. 15 is a diagram illustrating an arrangement of each of strain detection elements in a strain body according to a second embodiment.

Next, a second embodiment of the weight detection sensor disclosed here will be described with reference to FIGS. 15 and 16.

In the weight detection sensor according to this embodiment, the first strain detection element SG1 and the third strain detection element SG3 of the strain body 20 are arranged on the same side about the front-back direction center line FRL and are arranged on the opposite sides about the left-right direction center line SCL. The first strain detection element SG1 and the third strain detection element SG3 are arranged in line symmetry with the left-right direction center line SCL being a center of the symmetry. The second strain detection element SG2 and the fourth strain detection element SG4 are arranged on the same side about the front-back direction center line FRL and are arranged on the opposite sides about the left-right direction center line SCL. The second strain detection element SG2 and the fourth strain detection element SG4 are arranged in line symmetry with the left-right direction center line SCL being a center of the symmetry. The second embodiment is different from the first embodiment in this point. The other configuration is similar to that of the first embodiment, and the same reference numerals will be attached and description thereof will be omitted.

In a case where the relative angular displacement in the front-back direction is generated as illustrated in FIG. 12, the strain caused by the relative angular displacement is offset between the first strain detection element SG1 and the third strain detection element SG3 and the strain caused by the relative angular displacement is offset between the second strain detection element SG2 and the fourth strain detection element SG4 as in the first embodiment.

Figure 16:
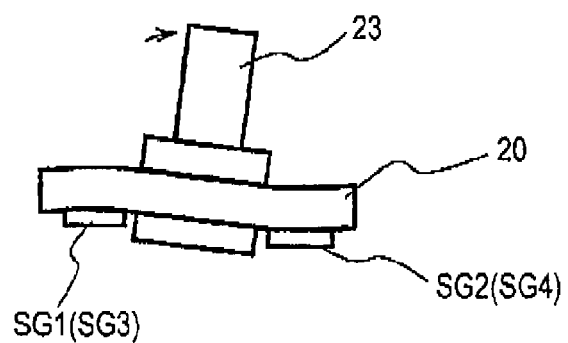
FIG. 16 is an explanatory diagram, viewed from a back face, illustrating a state where the strain body according to the second embodiment is deformed by the rotational moment load component working in the left-right direction when the relative angular displacement is received in the oblique direction that is inclined from the front-back direction.

However, the relative angular displacement may be generated to affect not only the strict front-back direction but also the left-right direction as illustrated in FIG. 16. Assuming that the respective strains of the first strain detection element SG1, the second strain detection element SG2, the third strain detection element SG3, and the fourth strain detection element SG4 caused by the rotational moment of the relative angular displacement in this case are $\Delta s1y$, $\Delta s2y$, $\Delta s3y$, and $\Delta s4y$, the strain is $S1+\Delta s1y$ at the position where the first strain detection element SG1 is adhered since the strain value (refer to FIG. 8) detected to be increased by the compressive deformation is further subjected to the compressive deformation. The strain is $S2+\Delta s2y$ at the position where the second strain detection element SG2 is adhered since the strain value (refer to FIG. 8) increased by the tensile deformation is further subjected to the tensile deformation. The strain value is $S3+\Delta s3y$ at the position where the third strain detection element SG3 is adhered since the strain value (refer to FIG. 8) detected to be increased by the compressive deformation is further subjected to the compressive deformation. The strain value is $S4-\Delta s4y$ at the position where the fourth strain detection element SG4 is adhered since the strain value (refer to FIG. 8) increased by the tensile deformation is subjected to the compressive deformation.

When these strains are substituted in the equation of the voltage e output to the Wheatstone bridge circuit, $e=(E/4)\times K\times\{(S1+\Delta s1y)-(S2+\Delta s2y)+(S3+\Delta s3y)-(S4-\Delta s4y)\}$.

In short, $e=(E/4)\times K\times\{(S1-S2+S3-S4)+(\Delta s1y-\Delta s2y)-(\Delta s3y-\Delta s4y)\}$.

Herein, the second strain detection element SG2 is on the opposite side about the front-back direction center line FRL with respect to the first strain detection element SG1 and the fourth strain detection element SG4 is on the opposite side about the front-back direction center line FRL with respect to the third strain detection element SG3, and thus are considered to have approximate strain values. Accordingly, $\Delta s1y$ is equal to $\Delta s2y$, $\Delta s3y$ is equal to $\Delta s4y$, $\Delta s1y-\Delta s2y$ is equal to zero, and $\Delta s3y-\Delta s4y$ is equal to zero.

Accordingly, $e=(E/4)\times K\times(S1-S2+S3-S4)+0-0$, and the strain generated for the relative angular displacement to affect not only the strict front-back direction but also the left-right direction is offset by the strain values of the first strain detection element SG1 and the second strain detection element SG2 and is offset by the strain values of the third strain detection element SG3 and the fourth strain detection element SG4.

In this manner, the first strain detection element SG1 and the second strain detection element SG2 are arranged on the opposite sides about the front-back direction center line FRL in the strain body 20 and the third strain detection element SG3 and the fourth strain detection element SG4 are arranged on the opposite sides about the front-back direction center line FRL in the strain body 20 in this embodiment, and thus even the strain generated in each of the strain detection elements SG1 to SG4 caused by the relative angular displacement affecting not only the strict front-back direction but also the left-right direction such as the direction inclined from the front-back direction can be offset by the first strain detection element SG1 and the second strain detection element SG2 on the opposite sides about the front-back direction center line FRL and the third strain detection element SG3 and the fourth strain detection element SG4 on the opposite sides about the front-back direction center line FRL. As such, the weight of the passenger can be accurately detected.

Embodiment 3

Figure 17:
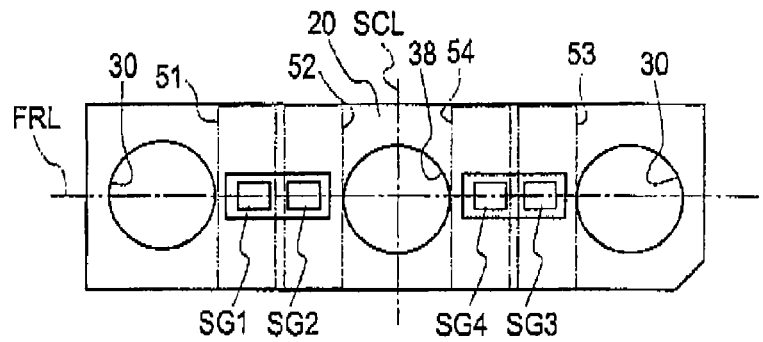
FIG. 17 is a diagram illustrating an arrangement of each of strain detection elements in a strain body according to a third embodiment.

Next, a third embodiment of the weight detection sensor disclosed here will be described with reference to FIG. 17.

The weight detection sensor of this embodiment is different from the first embodiment in that the first strain detection element SG1, the second strain detection element SG2, the fourth strain detection element SG4, and the third strain detection element SG3 are arranged on the front-back direction center line FRL in the strain body 20. The other configuration is similar to that of the first embodiment, and the same reference numerals will be attached and description thereof will be omitted.

According to the weight detection sensor of this embodiment, the first strain detection element SG1, the second strain detection element SG2, the fourth strain detection element SG4, and the third strain detection element SG3 are arranged on the front-back direction center line FRL in the strain body 20.

In a case where the relative angular displacement in the front-back direction is generated as illustrated in FIG. 12, the strain caused by the relative angular displacement is offset between the first strain detection element SG1 and the third strain detection element SG3 and the strain caused by the relative angular displacement is offset between the second strain detection element SG2 and the fourth strain detection element SG4 as in the first embodiment.

Even the strain generated in each of the strain detection elements SG1 to SG4 caused by the relative angular displacement affecting not only the strict front-back direction but also the left-right direction such as the direction inclined from the front-back direction can be offset by a left side part and a right side part of each of the strain detection elements SG1 to SG4, which are on the opposite sides about the front-back direction center line FRL, in the left-right direction. As such, the weight of the passenger can be accurately detected.

Embodiment 4

Figure 18:
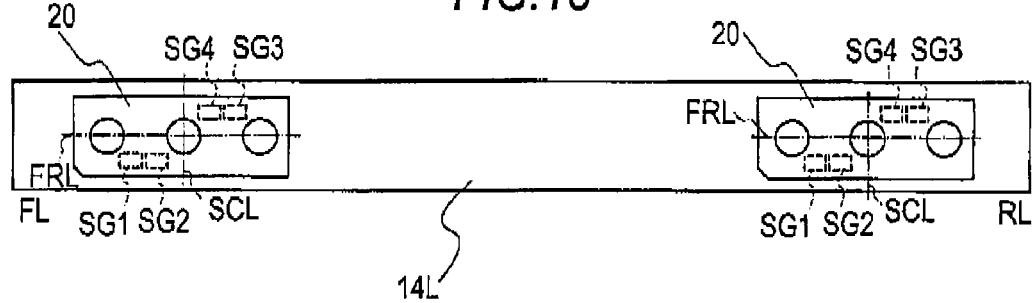
FIG. 18 is a diagram illustrating a weight detection sensor according to a fourth embodiment arranged in a front end portion and a back end portion of a left side upper rail.

Next, a fourth embodiment of the weight detection sensor disclosed here will be described with reference to FIG. 18.

A vehicle seat apparatus according to this embodiment is different from the vehicle seat apparatus 100 according to the first embodiment in that the weight detection sensor 10 according to the first embodiment is fixed to the mounting surface 18 of the front end portion FL and the mounting surface 18 of the back end portion RL of the left side upper rail 14L of the slide rail as the floor side fixed member. The other configuration is similar, and the same reference numerals and drawings will be used and description thereof will be omitted. Herein, only the difference will be described.

Figure 19:
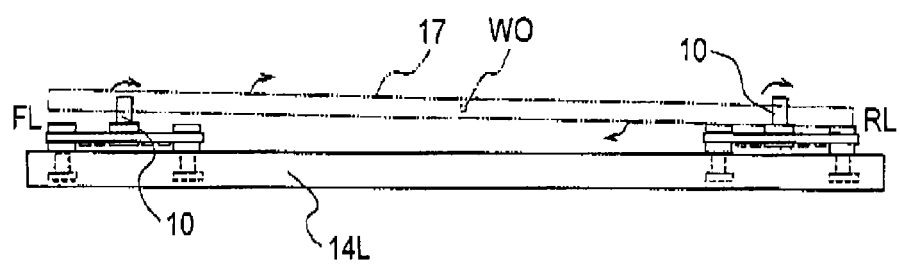
FIG. 19 is a diagram illustrating a relative angular displacement that is received by the weight detection sensor according to the fourth embodiment which is fixed to the upper rail.

When the relative angular displacement is generated between the seat frame 17 and the left side upper rail 14L of this embodiment as illustrated in FIG. 19, both the weight detection sensor 10 in the front end portion FL of the left side upper rail 14L and the weight detection sensor 10 in the back end portion RL of the left side upper rail 14L are subjected to, for example, a clockwise rotational moment by the seat frame 17 as illustrated in FIG. 19.

In this embodiment, the strains generated by the relative angular displacement can be offset independently of each other in the weight detection sensors on the mounting surface 18 of the front end portion FL of the left side upper rail 14L and on the mounting surface 18 of the back end portion RL of the left side upper rail 14L, and the load of the passenger can be obtained by adding the load values based on the independently obtained strain data. The loads applied by the weight of the passenger to a front and a back of the vehicle seat apparatus 100 are different from each other in a case where the passenger sits in the vehicle seat apparatus 100, but the loads in the front and the back of the vehicle seat are detected by the respective weight detection sensors 10 on the mounting surface 18 of the front end portion FL of the left side upper rail 14L and the mounting surface 18 of the back end portion RL of the left side upper rail 14L, and thus the weight of the passenger can be accurately detected.

Figure 20:
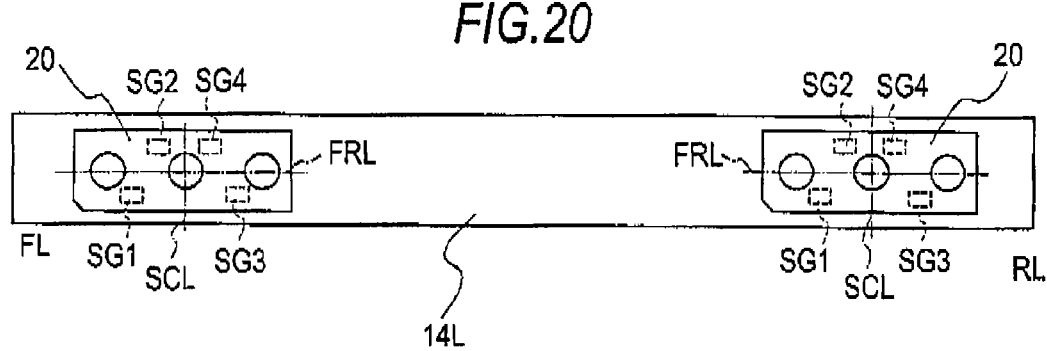
FIG. 20 is a diagram illustrating another example of the fourth embodiment.

The weight detection sensor according to this embodiment may be the weight detection sensor according to the first embodiment, and the first strain detection element SG1 and the third strain detection element SG3 are arranged on the opposite sides about the front-back direction center line FRL and are arranged on the opposite sides about the left-right direction center line SCL and the second strain detection element SG2 and the fourth strain detection element SG4 are arranged on the opposite sides about the front-back direction center line FRL and are arranged on the opposite sides about the left-right direction center line SCL. However, the arrangement is not limited thereto but, as illustrated in FIG. 20 for example, the first strain detection element SG1 and the third strain detection element SG3 may be arranged on the same side about the front-back direction center line FRL, the second strain detection element SG2 and the fourth strain detection element SG4 may be arranged on the same side, the first strain detection element SG1 and the second strain detection element SG2 may be arranged on the opposite sides about the front-back direction center line FRL, and the third strain detection element SG3 and the fourth strain detection element SG4 may be arranged on the opposite sides about the front-back direction center line FRL to correspond to the second embodiment.

Figure 21:
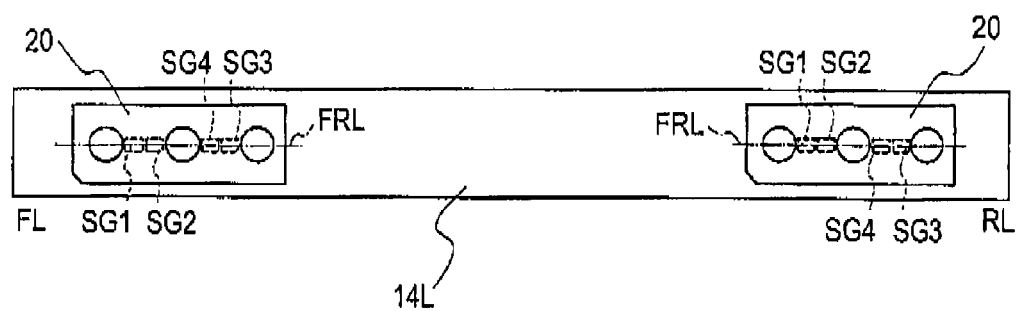
FIG. 21 is a diagram illustrating yet another example of the fourth embodiment.

In addition, as illustrated in FIG. 21, the weight detection sensor according to this embodiment may be the weight detection sensor according to the third embodiment, and the first strain detection element SG1, the second strain detection element SG2, the fourth strain detection element SG4, and the third strain detection element SG3 may be arranged in parallel on the front-back direction center line FRL, or may be arranged in the front end portion FL and the back end portion RL of the left side upper rail 14L.

In the above description, each of the first to fourth strain detection elements SG1 to SG4 is adhered to a lower surface side outer surface of the strain body 20. However, the place is not limited thereto and, for example, the first to fourth strain detection elements SG1 to SG4 may be adhered to an upper surface side outer surface of the strain body 20.

In addition, the weight detection device is arranged in the front end portion FL and the back end portion RL of the left side upper rail 14L in the above description. However, the place is not limited thereto but, for example, the weight detection device may be arranged in the front end portion FR and a back end portion RR of the right side upper rail 14R.

In addition, the connection member 23 is fixed to the seat frame 17 and the first and second lower brackets 21a and 21b are fixed to the left side upper rail 14L during the assembly of the strain body 20 in the above-described embodiment. However, the structure is not limited thereto but, for example, the connection member may be fixed to the upper rail and the first and second lower brackets may be fixed to the seat frame.

In the above description, the relative angular displacement is caused by a torsional deformation of the seat frame 17. However, the type is not limited thereto but, for example, the left and right upper rails may be rotated in opposite directions about an axis of rotation in the left-right direction by a torsional deformation of the vehicle floor and the relative angular displacement may be generated between the seat frame and itself by the rotation of the upper rails.

The specific configuration of the above-described embodiments is an example disclosed here, and various aspects not limited to the specific configuration can be adopted without departing from the scope thereof.

A first aspect of this disclosure is directed to a weight detection sensor interposed between a seat side fixing member fixing a vehicle seat and a floor side fixed member fixing the seat side fixing member to a vehicle floor to measure a load of a passenger sitting in the vehicle seat, the weight detection sensor including a strain body fixed to both end portions of a mounting surface formed on one of the floor side fixed member and the seat side fixing member at a predetermined distance from the mounting surface, the strain body extending in a front-back direction of the vehicle seat, a connection member fixed to a central portion of the strain body in a vertical direction and fixed to the other one of the floor side fixed member and the seat side fixing member, and a Wheatstone bridge circuit where a first strain detection element and a third strain detection element are arranged on sides facing each other and a second strain detection element and a fourth strain detection element are arranged on sides facing each other, each of the strain detection elements being a variable resistor, in which the first strain detection element is adhered to a first tensile position of the strain body where an outer surface of the strain body is subjected to a tensile deformation and the third strain detection element is adhered to a first compression position of the strain body where the outer surface of the strain body is subjected to a compressive deformation on a side opposite to the first strain detection element about a left-right direction center line vertical to a front-back direction of the strain body in a state where a relative angular displacement in the front-back direction works in one direction between the seat side fixing member and the floor side fixed member, the second strain detection element is adhered to a second compression position of the strain body where the outer surface of the strain body is subjected to the compressive deformation on the same side as the first strain detection element with respect to the left-right direction center line of the strain body and the fourth strain detection element is adhered to a second tensile position of the strain body where the outer surface of the strain body is subjected to the tensile deformation on a side opposite to the second strain detection element with respect to the left-right direction center line of the strain body in the state where the relative angular displacement in the front-back direction works in the one direction between the seat side fixing member and the floor side fixed member, and the first to fourth strain detection elements are equally adhered on both sides of a front-back direction center line in the strain body.

A second aspect of this disclosure is directed to the weight detection sensor according to the first aspect, wherein the first strain detection element and the third strain detection element are arranged on opposite sides about the front-back direction center line in the strain body, and the second strain detection element and the fourth strain detection element are arranged on opposite sides about the front-back direction center line in the strain body.

A third aspect of this disclosure is directed to the weight detection sensor according to the first aspect, wherein the first strain detection element and the second strain detection element are arranged on opposite sides about the front-back direction center line in the strain body, and the third strain detection element and the fourth strain detection element are arranged on opposite sides about the front-back direction center line in the strain body.

A fourth aspect of this disclosure is directed to the weight detection sensor according to the first aspect, wherein the first strain detection element, the second strain detection element, the fourth strain detection element, and the third strain detection element are arranged on the front-back direction center line in the strain body.

A fifth aspect of this disclosure is directed to a vehicle seat apparatus including a seat side fixing member fixing a vehicle seat and a floor side fixed member fixing the seat side fixing member to a vehicle floor, in which the floor side fixed member is a pair of slide rails disposed to be slidable in a vehicle front-back direction with respect to the vehicle floor and arranged in parallel with each other, and the weight detection sensor according to any one of the first aspect to the fourth aspect described above is fixed to the mounting surface on a front side and the mounting surface on a back side in a front-back direction of the vehicle seat in at least one of the pair of slide rails.

According to the first aspect of this disclosure, the first strain detection element is adhered to the first tensile position of the strain body where the outer surface of the strain body is subjected to the tensile deformation in a state where the relative angular displacement in the front-back direction works in one direction between the seat side fixing member and the floor side fixed member, and the third strain detection element is adhered to the first compression position of the strain body where the outer surface of the strain body is subjected to the compressive deformation on the side opposite to the first strain detection element about the left-right direction center line vertical to the front-back direction of the strain body in the state. Accordingly, when the relative angular displacement works in the one direction, strain values of the first strain detection element and the third strain detection element are detected in a state where a tensile strain component generated at the first tensile position and a compressive strain component generated at the first compression position are offset.

In the state, the second strain detection element is adhered to the second compression position of the strain body where the outer surface of the strain body is subjected to the compressive deformation on the same side as the first strain detection element with respect to the left-right direction center line of the strain body, and the fourth strain detection element is adhered to the second tensile position of the strain body where the outer surface of the strain body is subjected to the tensile deformation on the side opposite to the second strain detection element with respect to the left-right direction center line of the strain body. Accordingly, when the relative angular displacement works in the one direction, strain values of the second strain detection element and the fourth strain detection element are detected in a state where a compressive strain component generated at the second compression position and a tensile strain component generated at the second tensile position are offset.

The first to fourth strain detection elements are equally adhered to both sides of the front-back direction center line in the strain body, and thus even the strain values generated in each of the first to fourth strain detection elements caused by the relative angular displacement affecting not only the strict front-back direction but also the left-right direction such as a direction inclined from the front-back direction can be offset by the strain detection elements on the opposite sides about the front-back direction center line.

In this manner, even in a state where the relative angular displacement in the front-back direction works between the floor side fixed member and the seat side fixing member, the weight of the passenger can be accurately detected since the output voltage from the Wheatstone bridge circuit is based only on the strain detected when the passenger sits.

According to the second aspect of this disclosure, the first strain detection element and the third strain detection element are arranged on the opposite sides about the front-back direction center line in the strain body, and the second strain detection element and the fourth strain detection element are arranged on the opposite sides about the front-back direction center line in the strain body. Accordingly, even the strain values generated in each of the strain detection elements caused by the relative angular displacement affecting not only the strict front-back direction but also the left-right direction such as the direction inclined from the front-back direction can be offset by the first strain detection element and the third strain detection element that are on the opposite sides about the front-back direction center line and the second strain detection element and the fourth strain detection element on the opposite sides about the front-back direction center line. As such, the weight of the passenger can be accurately detected since the output voltage from the Wheatstone bridge circuit is based only on the strain detected when the passenger sits.

According to the third aspect of this disclosure, the first strain detection element and the second strain detection element are arranged on the opposite sides about the front-back direction center line in the strain body, and the third strain detection element and the fourth strain detection element are arranged on the opposite sides about the front-back direction center line in the strain body. Accordingly, even the strain values generated in each of the strain detection elements caused by the relative angular displacement affecting not only the strict front-back direction but also the left-right direction such as the direction inclined from the front-back direction can be offset between the first strain detection element and the second strain detection element that are on the opposite sides about the front-back direction center line and between the third strain detection element and the fourth strain detection element on the opposite sides about the front-back direction center line. As such, the weight of the passenger can be accurately detected since the output voltage from the Wheatstone bridge circuit is based only on the strain detected when the passenger sits.

According to the fourth aspect of this disclosure, the first strain detection element, the second strain detection element, the fourth strain detection element, and the third strain detection element are arranged on the front-back direction center line in the strain body. Accordingly, even the strain generated in each of the strain detection elements caused by the relative angular displacement affecting not only the strict front-back direction but also the left-right direction such as the direction inclined from the front-back direction can be offset by a left side part and a right side part of each of the strain detection elements, which are on the opposite sides about the front-back direction center line. For example, the right side part is subjected to the compressive deformation when the left side part is subjected to the tensile deformation. As such, the weight of the passenger can be accurately detected.

According to the fifth aspect of this disclosure, the strain generated by the relative angular displacement can be offset in each of the weight detection sensors on the mounting surface on the front side and on the mounting surface on the back side, and the load of the passenger can be obtained by adding the load values based on the independently obtained strain data. The loads applied by the weight of the passenger to a front and a back of the vehicle seat are different from each other in a case where the passenger sits in the vehicle seat, but the loads in the front and the back of the vehicle seat are detected by the respective weight detection sensors on the mounting surface on the front side and the mounting surface on the back side, and thus the weight of the passenger can be accurately detected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A weight detection sensor interposed between a seat side fixing member fixing a vehicle seat and a floor side fixed member fixing the seat side fixing member to a vehicle floor to measure a load of a passenger sitting in the vehicle seat, the weight detection sensor comprising:
    a strain body fixed to both end portions of a mounting surface formed on one of the floor side fixed member and the seat side fixing member at a predetermined distance from the mounting surface, the strain body extending in a front-back direction of the vehicle seat;
    a connection member fixed to a central portion of the strain body in a vertical direction and fixed to the other one of the floor side fixed member and the seat side fixing member; and
    a Wheatstone bridge circuit where a first strain detection element and a third strain detection element are arranged on sides facing each other and a second strain detection element and a fourth strain detection element are arranged on sides facing each other, each of the strain detection elements being a variable resistor,
    wherein the first strain detection element is adhered to a first tensile position of the strain body where an outer surface of the strain body is subjected to a tensile deformation and the third strain detection element is adhered to a first compression position of the strain body where the outer surface of the strain body is subjected to a compressive deformation on a side opposite to the first strain detection element about a left-right direction center line vertical to a front-back direction of the strain body in a state where a relative angular displacement in the front-back direction works in one direction between the seat side fixing member and the floor side fixed member,
    the second strain detection element is adhered to a second compression position of the strain body where the outer surface of the strain body is subjected to the compressive deformation on the same side as the first strain detection element with respect to the left-right direction center line of the strain body and the fourth strain detection element is adhered to a second tensile position of the strain body where the outer surface of the strain body is subjected to the tensile deformation on a side opposite to the second strain detection element with respect to the left-right direction center line of the strain body in the state where the relative angular displacement in the front-back direction works in the one direction between the seat side fixing member and the floor side fixed member, and
    the first to fourth strain detection elements are equally adhered on both sides of a front-back direction center line in the strain body with two of the first to fourth strain detection elements on a first side of the front-back direction center line in the strain body and the remaining two of the first to fourth strain detection elements on a second side of the front-back direction center line in the strain body, the front-back direction center line of the strain body extending between the end portions of the mounting surface.

2. The weight detection sensor according to claim 1, wherein the first strain detection element and the third strain detection element are arranged on opposite sides about the front-back direction center line in the strain body, and
    the second strain detection element and the fourth strain detection element are arranged on opposite sides about the front-back direction center line in the strain body.

3. The weight detection sensor according to claim 1, wherein the first strain detection element and the second strain detection element are arranged on opposite sides about the front-back direction center line in the strain body, and
    the third strain detection element and the fourth strain detection element are arranged on opposite sides about the front-back direction center line in the strain body.

4. The weight detection sensor according to claim 1, wherein the first strain detection element, the second strain detection element, the fourth strain detection element, and the third strain detection element are arranged on the front-back direction center line in the strain body.

5. A vehicle seat apparatus comprising a seat side fixing member fixing a vehicle seat and a floor side fixed member fixing the seat side fixing member to a vehicle floor,
    wherein the floor side fixed member is a pair of slide rails disposed to be slidable in a vehicle front-back direction with respect to the vehicle floor and arranged in parallel with each other, and
    the weight detection sensor according to claim 1 is fixed to the mounting surface on a front side and the mounting surface on a back side in a front-back direction of the vehicle seat in at least one of the pair of slide rails.

6. A vehicle seat apparatus comprising a seat side fixing member fixing a vehicle seat and a floor side fixed member fixing the seat side fixing member to a vehicle floor,
wherein the floor side fixed member is a pair of slide rails disposed to be slidable in a vehicle front-back direction with respect to the vehicle floor and arranged in parallel with each other, and
the weight detection sensor according to claim 2 is fixed to the mounting surface on a front side and the mounting surface on a back side in a front-back direction of the vehicle seat in at least one of the pair of slide rails.

7. A vehicle seat apparatus comprising a seat side fixing member fixing a vehicle seat and a floor side fixed member fixing the seat side fixing member to a vehicle floor,
wherein the floor side fixed member is a pair of slide rails disposed to be slidable in a vehicle front-back direction with respect to the vehicle floor and arranged in parallel with each other, and
the weight detection sensor according to claim 3 is fixed to the mounting surface on a front side and the mounting surface on a back side in a front-back direction of the vehicle seat in at least one of the pair of slide rails.

8. A vehicle seat apparatus comprising a seat side fixing member fixing a vehicle seat and a floor side fixed member fixing the seat side fixing member to a vehicle floor,
wherein the floor side fixed member is a pair of slide rails disposed to be slidable in a vehicle front-back direction with respect to the vehicle floor and arranged in parallel with each other, and
the weight detection sensor according to claim 4 is fixed to the mounting surface on a front side and the mounting surface on a back side in a front-back direction of the vehicle seat in at least one of the pair of slide rails.

9. The weight detection sensor according to claim 1, wherein the strain body includes two fixing holes one at each of the end portions of the strain body and the front-back direction center line of the strain body intersects centers of the two fixing holes.

* * * * *